June 30, 1942.  V. C. KRUPA ET AL  2,288,165
FILM TREATING APPARATUS AND PROCESS
Filed March 14, 1939  2 Sheets-Sheet 2
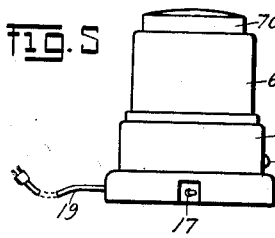
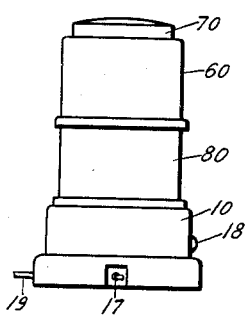
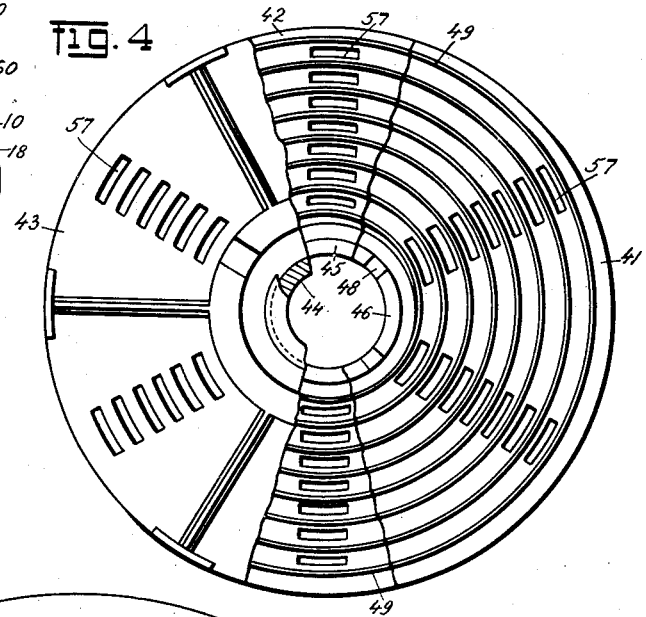
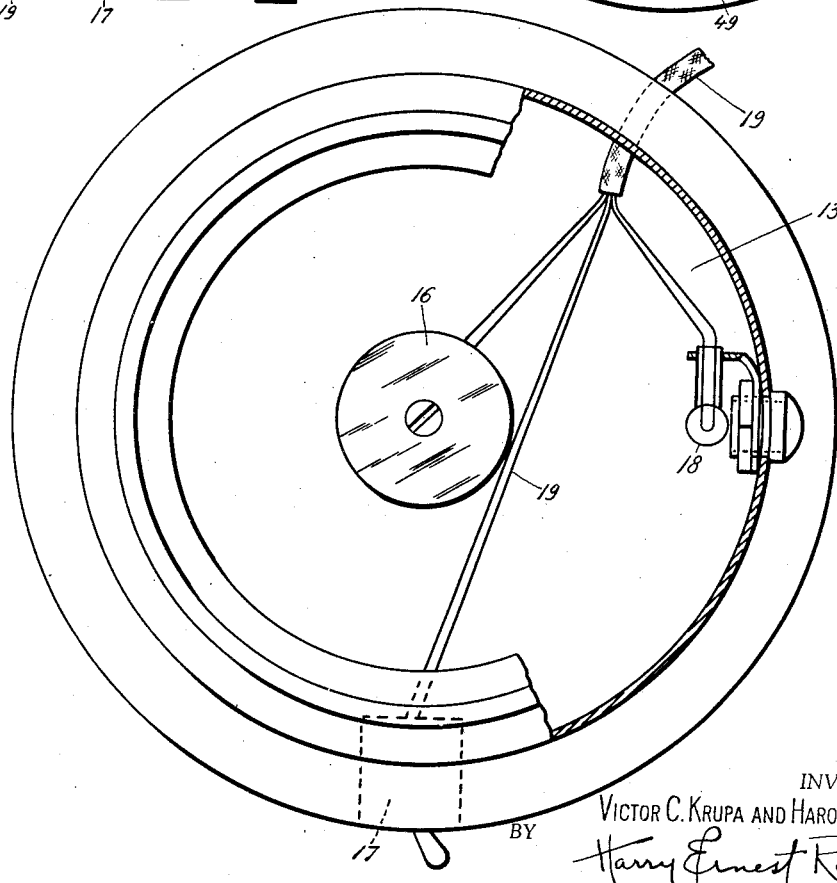
INVENTORS
VICTOR C. KRUPA AND HAROLD R. FLECK
BY Harry Ernest Rubens
ATTORNEY.

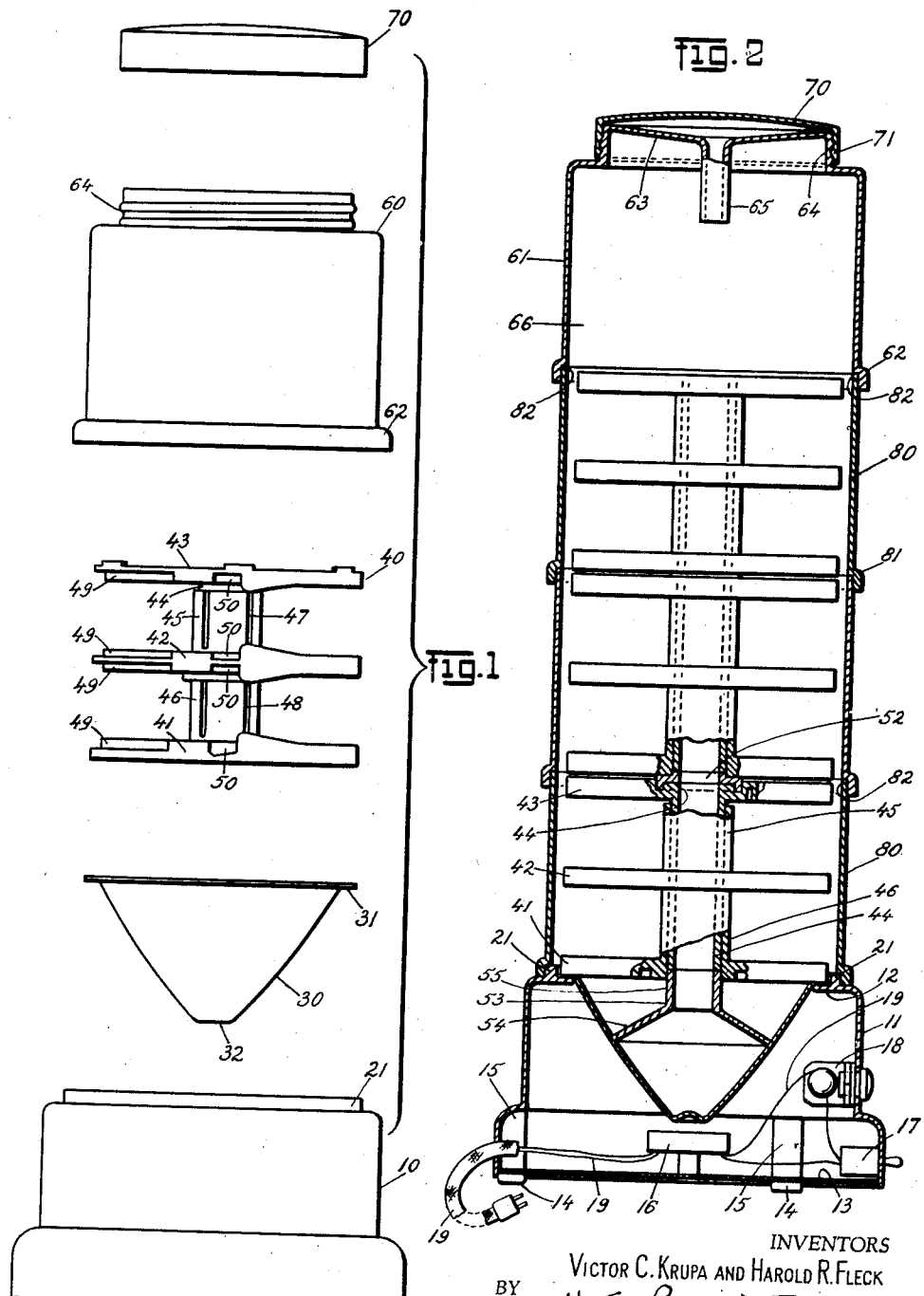

Patented June 30, 1942

2,288,165

UNITED STATES PATENT OFFICE 2,288,165

FILM TREATING APPARATUS AND PROCESS

Victor C. Krupa, Woodcliff Lake, N. J., and Harold R. Fleck, New York, N. Y., assignors to Vaporate Company Inc., a corporation of New York Application March 14, 1939, Serial No. 261,776

4 Claims. (Cl. 95—89)

Our invention relates to a portable apparatus and process for treating exposed and developed photographic film in order to increase its resistance to abrasion, heat, the absorption of moisture, and to lubricate the same.

An important object of our invention is to provide an apparatus for carrying out our process which shall be portable, easy to manipulate, and adaptable to conjoint use with devices now used by photographers for other purposes.

We have found that the use of heat is an important element in carrying out our process and a further object, therefore, is the design of an apparatus which will permit the use of heat in the treatment of inflammable film, or film subject to deterioration under certain temperatures.

A further object consists in providing a device which may be built up in units to increase its capacity.

In the use of our process we employ a plurality of chemicals which are separately inserted into the treating chamber and converted into vapors, and it is, therefore, a further object of our invention to provide apparatus which will permit successive insertions of chemicals without substantially disturbing the temperature of the film and chemical vapors used therein, and without allowing the chemicals to come directly into contact with the films before vaporization occurs.

Other objects are to provide means for causing a circulation of the vapors within a closed chamber to establish continuous and intimate contact with the film; to use means for supporting the film in a continuous spirally spaced position, insuring that the vapors will have maximum contact with the film; to direct the heated vapors to the coldest parts of the apparatus to create uniform conditions throughout the apparatus; to create an apparatus easy to clean; and to design a device inexpensive to manufacture.

We accomplish these and other objects and obtain our new results as will be apparent from the device described in the following description, particularly pointed out in the attached claims, and illustrated in the accompanying drawings, in which:

Fig. 1 is an exploded view of our single unit device indicating the various parts thereof.

Fig. 2 is a sectional view of our multi-unit device.

Fig. 3 is a plan view of the base of our device with a portion of the rim removed.

Fig. 4 is a plan view of a reel, in section, for supporting the film.

Fig. 5 is a side view of our single unit device.

Fig. 6 is a side view of a double unit device.

In the drawings, reference numeral 10 designates the base; 30, the liquid support; 40, the reel; 60, the cover; 70, the cap.

The base of the device is provided with a cylindrical wall section 11, having an upper rim 12 and a lower base panel 13, supported to the lower wall section in some suitable manner, as for example, by screwing rubber sections 14 through base panel 13 into sections 15 moulded in the wall 11. A suitable heating unit 16, is mounted on the center of base panel 13 and is electrically connected to switch 17 and pilot light 18 by wiring 19. These parts are conventional and well known in the art and will not be described in detail. Their portrayal is essentially schematic.

Upon the rim 12 of base 10, rests the cone shaped liquid support 30 which is provided with a shoulder 31 for engagement with the rim. The apex 32 of the cone is supported a short distance above the heater, or in actual contact therewith.

Upon the shoulder 31 rests the reel 40. The particular reel illustrated is provided with two sections for carrying film; although any type of reel, with single or double sections, now in commercial use may be accommodated, provided it has apertures or slots through the sides, permitting circulation of vapors as hereinafter described. In the form illustrated, the reel 40 is composed of three sections, 41, 42 and 43, with a hollow stem 44 integral with section 43, extending through sleeve 45 integral with 42, and sleeve 46 integral with 41. Sleeves 45 and 46 are slotted as at 47 and 48, respectively, to enable the sleeve to grasp the stem 44 and hold their positions thereon. The sections are provided with spirally formed ridges 49 in juxtaposition, and of familiar design, to enable the films to be threaded into openings 50 and inserted therein by longitudinally applied pressure.

The cover 60 has cylindrically formed walls 61, provided with shoulders 62 to engage the circumferential ridge 21 of the base 10. The upper portion comprises the funnel shaped section 63, having threaded side walls 64, and a downwardly extending pipe 65, preferably moulded, all integrally with the cover, but may be formed separately.

A cap 70 is threaded as at 71, for engagement with threads 64 of the cover.

In the multi-unit section shown in Fig. 2, a collar or sleeve 80 is provided with shoulder 81 at its lower section, and corresponding edge 82 for engagement with shoulder 62 of the cover ridge 21 of the base, or 81 of the adjacent sleeve. A number of reels are inserted into the corresponding number of sleeves, the reels resting one on another, as is similarly done with the sleeves. When two or more double reels are used, the cover 60 may be used as an air chamber, which we have found, insures proper circulation of the vapors.

The design of the reels permits the hollow stem 44 to function as a conduit both for the vapors, and for the chemicals. In the multiple unit device, the stems are connected by a coupling 52 which is shaped to permit the two reels to be closely positioned one above the other.

We have found that in the multiple unit devices, it is imperative to funnel the hot vapors through the center of the reels into the top air chambers where they will descend through the films spaced edgewise, thus insuring an intimate contact with the entire surface of the films to be processed. The importance of this procedure is to insure that the contacting vapors will reach the film furthest away from the heating unit in a heated condition. The vapors in contact with the lower reels will be maintained in a heated stage by reason of the conducted heat from the heating unit.

We accomplish the circulating cycle by using an inverted funnel 53 which is seated with its flared end 54 within the cone shaped liquid support 30. The end 55 fits snugly into the sleeve 46 adjacent stem 44 of the reel.

Between adjacent reels the coupling 52 is positioned as previously stated which permits the vapors to rise directly into the chamber 66 within the cover 60, where the vapors are forced through slots 57, illustrated in Fig. 4, located in the three sections of the reels allowing the vapors to circulate therethrough.

In the particular process employed by us, the reels are mounted within the chambers formed by the cover 60, or collars 80 in the multi-unit device, and heated until the films are conditioned for the vapor treatment. Thereafter cap 70 is removed and a small quantity of emulsion treating liquid is inserted through funnel 65 in the cover. A pipe, not shown, may be employed to insure that the liquid will be entirely deposited within the liquid support 30. If used, the pipe will be withdrawn after inserting each liquid, and the cap 70 immediately replaced. The vapors are directed by convection current, in the single unit device, immediately through the slots 57 through the film spaced with the reels. A succession of various chemicals may be inserted through the cover, and allowed to circulate through the films in a vaporized state. Such chemicals may be for softening the film, for hardening the emulsion, for lubricating the film and for various other purposes known in the prior art.

In Fig. 5, a side view of the assembled single unit device is shown.

In Fig. 6, a two reel unit is illustrated, and although we recommend that an air chamber be inserted at the top in multi-unit devices, it is possible to get satisfactory results with the two reels occupying the space within the sleeve 80 and cover 61, respectively.

It is of utmost importance in the multi-unit devices that the heat losses be reduced to a minimum, since the rapid cooling of the vapors will reduce their effectiveness. We have found that this can be offset by increasing the temperature, but there are limitations to this possibility, because of the nature of the material being processed. The funnelling of the hot vapors directly to the coolest point is the most advantageous method of handling the problem, combined with the use of materials substantially non-conductive or of minimum conduction. The use of heat insulation, in addition to non-conductive materials, is helpful where the reels processed exceed three in number.

While the liquids are inserted into the liquid supporting means through the pipe 65 and the center stem 44 of the reel, our invention is not limited thereto, for the same results are obtainable by installing a small liquid transporting means laterally through the wall of the collar or cover into the liquid supporting means, that is closed after each liquid inserting operation.

We have in the foregoing accomplished the objects of our invention. The devices illustrated and described are of moulded construction adapted to mass production. It is apparent, however, that other materials and methods may be used which will accomplish the foregoing objects in a manner outlined in the annexed claims forming a part hereof.

We have thus described our invention, but we desire it understood that it is not confined to the particular forms or uses shown and described, the same being merely illustrative, and that the invention may be carried out in other ways without departing from the spirit of our invention, and, therefore, we claim broadly the right to employ all equivalent instrumentalities coming within the scope of the appended claims, and by means of which, objects of our invention are attained and new results accomplished, as it is obvious that the particular embodiments herein shown and described are only some of the many that can be employed to attain these objects and accomplish these results.

What we claim and desire to secure by Letters Patent, is as follows:

We claim:

1. A process for treating exposed and developed film, comprising the step of supplying a substantially uniform application of heat to dehydrate the film without warping the same, and immediately thereafter treating said heated film with vaporized chemicals.

2. A device for treating exposed and developed film comprising; a liquid supporting means; means for supporting film with the film sides in spaced position and in gaseous contact with the liquid supporting means; means for covering said liquid supporting means and the film supporting means; a heating unit for heating the liquid supporting means and for supplying heated air to the films; means for inserting a vaporable substance into said liquid supporting means without exposing the heated film; and means for supplying a substantially uniform application of heat to all parts of the film to avoid warping said film.

3. A device for treating exposed and developed film, comprising; a liquid supporting means, means for supporting film with the film sides in spaced position and in gaseous contact with the liquid supporting means; means for covering said liquid supporting means and the film supporting means; said covering means having an aperture for inserting a vaporable substance into the liquid supporting means through the aperture, and a vapor tight cover for the aperture; a heating unit for heating the liquid supporting means and for supplying heated air to the films; and means for supplying a substantially uniform application of heat to all parts of the film to avoid warping said film.

4. A device for treating exposed and developed film, comprising; a liquid supporting means; means for supporting film with the film sides in spaced position and in gaseous contact with the liquid supporting means; means for covering said liquid supporting means and the film supporting means; a heating unit for heating the liquid supporting means and for supplying heated air to the films; means for inserting a vaporable substance into said liquid supporting means without exposing the heated film; said film supporting means having a central channel for directing the vaporable substance into the liquid supporting means without touching the film and for directly funnelling the heat to the film sides furthest away from the liquid supporting means, for supplying a substantially uniform application of heat to all parts of the film to avoid warping said film.

VICTOR C. KRUPA.
HAROLD R. FLECK.